United States Patent
Inamoto

(10) Patent No.: US 9,098,289 B2
(45) Date of Patent: Aug. 4, 2015

(54) LADDER PROGRAM CREATION DEVICE

(75) Inventor: Kazumasa Inamoto, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/342,945

(22) PCT Filed: Sep. 15, 2011

(86) PCT No.: PCT/JP2011/071096
§ 371 (c)(1),
(2), (4) Date: Mar. 5, 2014

(87) PCT Pub. No.: WO2013/038541
PCT Pub. Date: Mar. 21, 2013

(65) Prior Publication Data
US 2014/0229911 A1    Aug. 14, 2014

(51) Int. Cl.
*G06F 9/44* (2006.01)
*G06F 3/0488* (2013.01)
(Continued)

(52) U.S. Cl.
CPC ............ *G06F 8/34* (2013.01); *G05B 19/056* (2013.01); *G06F 3/0488* (2013.01); *G06F 3/04817* (2013.01); *G05B 2219/13144* (2013.01); *G05B 2219/13145* (2013.01); *G06F 9/44* (2013.01)

(58) Field of Classification Search
CPC ............ G05B 19/056; G05B 2219/13196; G06F 3/0236; G06F 3/0237; G06F 3/04817
USPC ............ 700/31; 703/22; 717/105, 109, 113
See application file for complete search history.

(56) References Cited

U.S. PATENT DOCUMENTS 6,587,130 B1 * 7/2003 Amari et al. ............ 715/810
7,324,161 B2 * 1/2008 Hwang ............ 348/569
(Continued)

FOREIGN PATENT DOCUMENTS

JP    3-246614 A    11/1991
JP    4-346124 A    12/1992
(Continued)

OTHER PUBLICATIONS

"Communication dated Aug. 25, 2014 from The Taiwanese Intellectual Property Office in counterpart Taiwanese Patent Application No. 10321144800"; submitted with an IDS dated Oct. 17, 2014.*

(Continued)

*Primary Examiner* — Ryan Coyer
(74) *Attorney, Agent, or Firm* — Sughrue Mion, PLLC; Richard C. Turner

(57) ABSTRACT

Provided are: a display displaying a ladder-diagram-creating editor screen; a touch panel overlapped on the display; an operation detection unit detecting an operation on the panel; a display control unit causing the display to display a representative icon corresponding to one of programming items that are insertable into the diagram, and display a display box in which derived icons corresponding to other programming items insertable into the diagram are arranged around the representative, when the detection unit detects a touch operation on the panel at the representative; and an execution unit that, when the detection unit detects that a finger having performed the touch operation or a finger having performed the panel and slid is lifted-off the panel, inserts the item corresponding to the representative or derived icon displayed at a position where the finger is detected to be lifted-off, into the diagram.

5 Claims, 11 Drawing Sheets

(51) Int. Cl.
*G05B 19/05* (2006.01)
*G06F 3/0481* (2013.01)

(56) References Cited

U.S. PATENT DOCUMENTS

2008/0001928 A1* 1/2008 Yoshida .................. 345/173
2011/0295388 A1* 12/2011 Iwata et al. .................. 700/18

FOREIGN PATENT DOCUMENTS

| | | | |
|---|---|---|---|
| JP | 2000-112636 | A | 4/2000 |
| JP | 2000-163109 | A | 6/2000 |
| JP | 2000-207113 | A | 7/2000 |
| JP | 2000-267777 | A | 9/2000 |
| JP | 2002-175114 | A | 6/2002 |
| JP | 2003-67011 | A | 3/2003 |
| JP | 2004-21575 | A | 1/2004 |
| JP | 2008-9668 | A | 1/2008 |
| JP | 2008-282380 | A | 11/2008 |
| JP | 2008282380 | A * | 11/2008 |
| JP | 2010-122824 | A | 6/2010 |
| JP | 2010-176664 | A | 8/2010 |
| JP | 2010-244490 | A | 10/2010 |
| JP | 2011-76349 | A | 4/2011 |
| JP | 2011-86036 | A | 4/2011 |
| JP | 2011-107823 | A | 6/2011 |
| JP | 2011-135525 | A | 7/2011 |
| WO | 2009/041557 | A1 | 4/2009 |
| WO | 2010-089862 | A1 | 8/2010 |

OTHER PUBLICATIONS

"Taiwanese Office Action, mailed Apr. 15, 2014, Application No. 101101680"; submitted with an IDS dated Jun. 24, 2014.*
"Translation of Japanese Office Action, Apr. 30, 2014; Patent Application No. 2013-533413"; submitted with an IDS dated Jul. 10, 2014.*
Translation of Japanese Office Action, Apr. 30, 2014; Patent Application No. 2013-533413.
Communication dated Aug. 25, 2014 from The Taiwanese Intellectual Property Office in counterpart Taiwanese Patent Application No. 10321144800.
Taiwanese Office Action, mailed Apr. 15, 2014, Application No. 101101680.

* cited by examiner

LADDER PROGRAM CREATION DEVICE

CROSS REFERENCE TO RELATED APPLICATIONS

This application is a National Stage of International Application No. PCT/JP2011/071096, filed on Sep. 15, 2011, the contents of all of which are incorporated herein by reference in their entirety.

FIELD

The present invention relates to a ladder program creation device.

BACKGROUND

Conventionally, when a ladder program of a programmable logic controller (PLC) is created with a program creation device, a program creator selects an icon displayed on a list on a tool bar, a pallet or the like, using a pointing device such as a mouse, in order to make insertion into a ladder diagram on an editor screen, or manually inputs a mnemonic with a keyboard.

In a method of selecting a programming item using a pointing device, when performing an operation to select a desired icon from a displayed list of icons of a plurality of programming items, a programming item that is different from a desired programming item may be selected sometimes due to his/her erroneous operation of the pointing device.

Furthermore, in a method of manually inputting a mnemonic with a keyboard, an input operation is complicated, which requires more effort of a program creator.

Patent Literature 1 discloses a technique for a device having a touch panel function, in which a plurality of icons are displayed in a ring-shaped arrangement, and according to a drag operation performed on a display unit, the icons arranged in a ring shape are rotated and moved in the drag direction.

CITATION LIST

Patent Literature

Patent Literature 1: Japanese Patent Application Laid-open No. 2010-244490

SUMMARY

Technical Problem

However, in the above conventional technique, a display position of each of the icons displayed simultaneously on the display unit is decided regardless of the frequency of use of the icons. Therefore, even a frequently-used icon needs to be searched for from among a number of icons arranged in a ring shape. Particularly, in a case of programming items for a ladder program, because symbols of the programming items have already been fixed, it is difficult for the icon itself to have a more remarkable characteristic. Therefore, there is a possibility of erroneously clicking a different icon even when the icons are arranged in a ring shape.

The present invention has been achieved in view of the above-mentioned circumstances, and an object of the present invention is to provide a ladder program creation device that reduces possible selection of a programming item that is different from an intended programming item due to an erroneous operation.

Solution to Problem

In order to solve the above-mentioned problems and achieve the object, the present invention provides a ladder program creation device comprising: a display unit that displays an editor screen for creating a ladder diagram; a touch panel that is provided to overlap on the display unit; an operation detection unit that detects an operation performed on the touch panel; a display control unit that causes the display unit to display a representative icon corresponding to one of programming items that are insertable into the ladder diagram within the editor screen, and that causes the display unit to display a display box in which derived icons corresponding to other programming items that are insertable into the ladder diagram are arranged around the representative item, when the operation detection unit detects a touch operation on the touch panel at a position where the representative icon is displayed; and a processing execution unit that, when the operation detection unit detects that a finger having performed the touch operation or a finger having performed the touch panel and then slid is lifted off the touch panel, inserts the programming item corresponding to the representative icon or the derived icon displayed at a position where the finger is detected to be lifted off the touch panel, into the ladder diagram.

Advantageous Effects of Invention

In the ladder program creation device according to the present invention, an intuitive input operation is possible when creating a ladder program, and therefore it is possible to reduce a possibility of selecting a programming item that is different from an intended programming item due to an erroneous operation.

DESCRIPTION OF EMBODIMENTS

Embodiments of a ladder program creation device according to the present invention will be described below in detail with reference to the drawings. It is noted that the present invention is not limited to the embodiments.

First Embodiment

Figure 1:
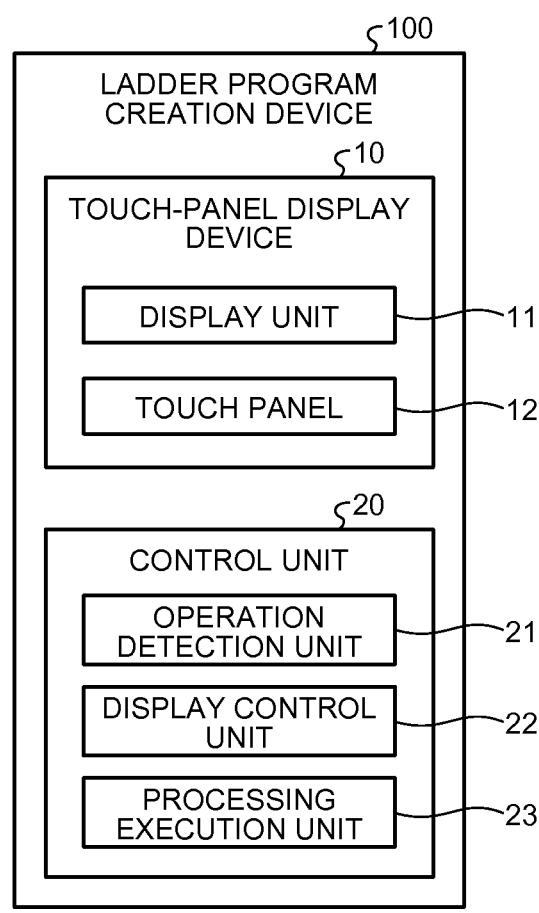
FIG. 1 is a diagram showing a configuration of a ladder program creation device according to a first embodiment of the present invention.

FIG. 1 is a diagram showing a configuration of a ladder program creation device according to a first embodiment of the present invention. A ladder program creation device 100 according to the present embodiment is a device that creates a ladder diagram by moving a cursor on a grid on an editor screen according to an operation by a program creator in an editor mode, and inserting a programming item into a position of the cursor. The ladder program creation device 100 includes a touch-panel display device 10 and a control unit 20. The touch-panel display device 10 includes a display unit 11 and a touch panel 12. The control unit 20 includes an operation detection unit 21, a display control unit 22, and a processing execution unit 23.

The display unit 11 displays an editor screen for creating a ladder program as a ladder diagram. The touch panel 12 is arranged to overlap on the display unit 11.

Figure 2:
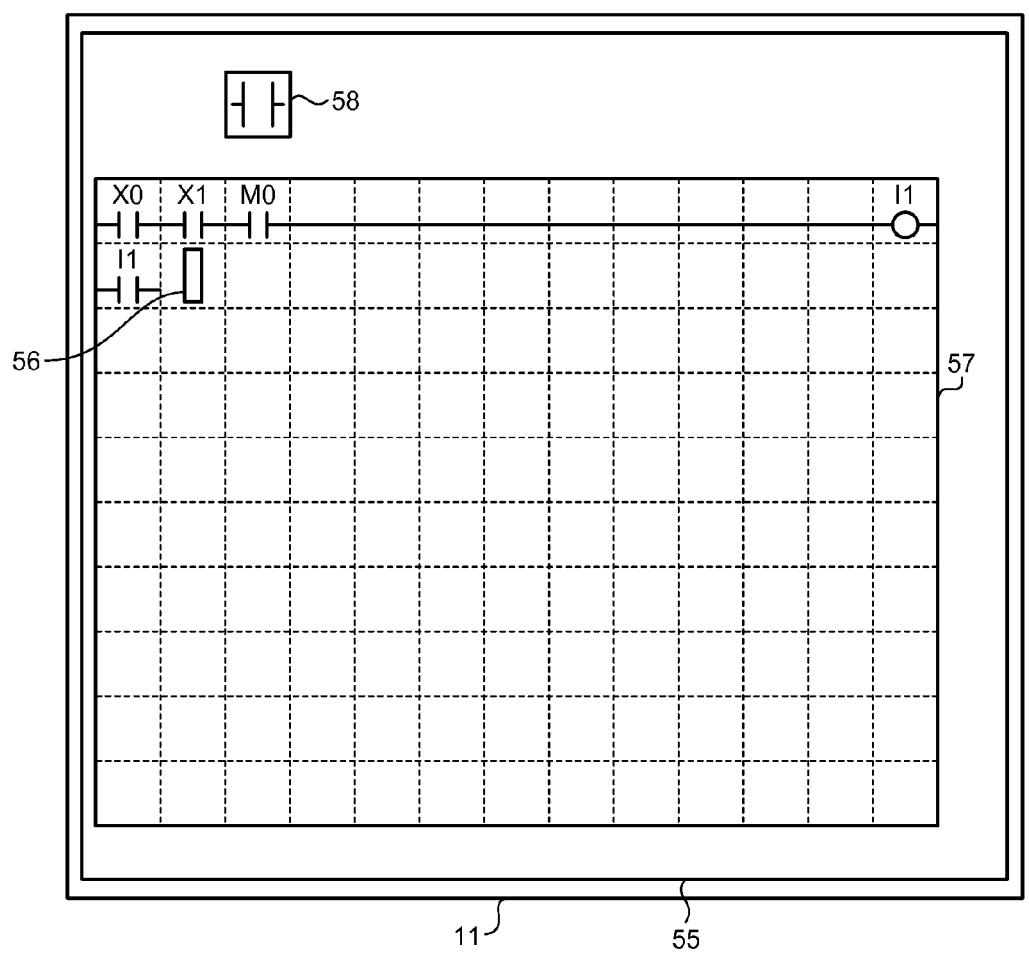
FIG. 2 is an illustration showing an example of an editor screen displayed by a display control unit.

The operation detection unit 21 detects an operation (touch, slide, and the like) performed on the touch panel 12. The display control unit 22 causes the display unit 11 to display an icon (representative icon) that is one (typical one) of programming items that are insertable into the ladder diagram at a current position of the cursor on the editor screen. FIG. 2 is an illustration showing an example of an editor screen displayed by the display control unit 22. The display control unit 22 causes the display unit 11 to display an icon 58 (representative icon) that is one (typical one) of programming items that are insertable into a ladder diagram 57 at a current position of a cursor 56 on an editor screen 55. Examples of the programming items include various kinds of symbols such as contact, coil and an application command (such as a MOV), which are used in a ladder diagram, and also include device names set for the symbols.

When the operation detection unit 21 detects a touch operation at a position where a representative icon is displayed, the display control unit 22 causes five icons (derived icons) each to be displayed within a display box in a cross formation, the icons show other candidate programming items that are insertable into a ladder diagram at a current position of a cursor on an editor screen. For example, on the top row in the ladder diagram, a contact cannot be arranged in parallel connection with the upper row. Therefore, in such a case, only derived icons for contacts that are not dedicated to the parallel connection are displayed as candidates.

Figure 3:
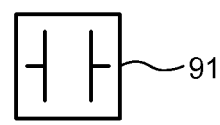
FIG. 3 is an illustration showing an example of screen transition when displaying a display box in which derived icons are arranged around a representative icon by performing a touch operation on the representative icon on an editor screen.
Figure 3:
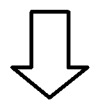
Figure 3:
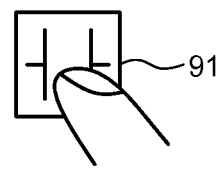
Figure 3:
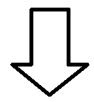
Figure 3:
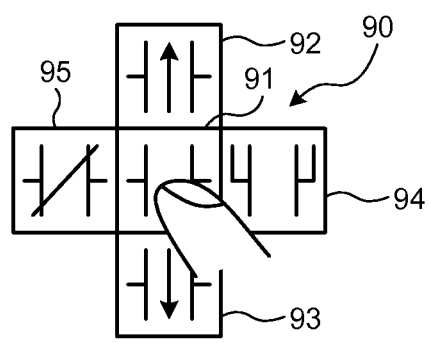

FIG. 3 is an illustration showing an example of screen transition when displaying a display box in which derived icons are arranged around a representative icon 91 by performing a touch operation on the representative icon 91 on an editor screen. When the operation detection unit 21 detects a touch operation at a position where the representative icon 91 is displayed, the display control unit 22 causes derived icons 92 to 95 to be displayed within a display box 90 in a cross formation.

In a case where there are other five or more kinds of candidate programming items, five icons including a page-switching-operation icon, a representative icon and derived icons are displayed on a display unit.

According to an instruction from the operation detection unit 21, the processing execution unit 23 inserts a programming item into a position of a cursor in a ladder diagram on the editor screen.

Figure 4:
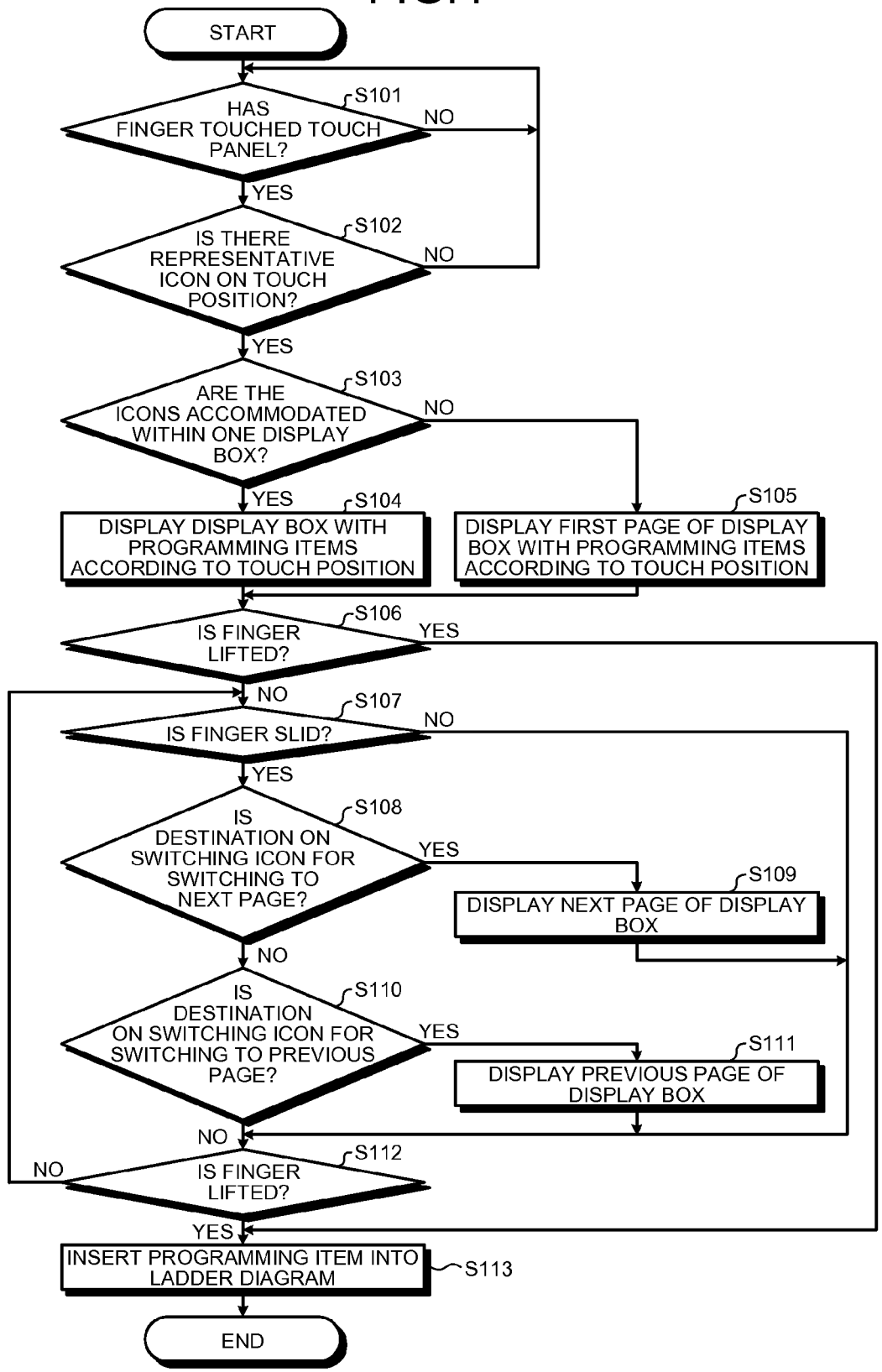
FIG. 4 is a flowchart showing an operation flow in an editor mode of the ladder program creation device according to the first embodiment.

An operation of the ladder program creation device 100 is explained. FIG. 4 is a flowchart showing an operation flow in an editor mode of the ladder program creation device 100 according to the first embodiment. Prior to the following operation, a program creator is supposed to move a cursor to a desired position (on a grid) on an editor screen in advance. The operation detection unit 21 monitors whether a program creator performs a touch operation on the touch panel 12 (Step S101). When the operation detection unit 21 detects that the touch operation is performed (YES at Step S101), the display control unit 22 determines whether there is a representative icon at a position where the touch operation is performed (Step S102). When there is not a representative icon at a position where the touch operation is performed (NO at Step S102), the operation detection unit 21 continues to monitor the touch operation. Also when the operation detection unit 21 does not detect the touch operation (NO at Step S101), the operation detection unit 21 continues to monitor the touch operation (Step S101).

When there is a representative icon at a position where the touch operation is performed (YES at Step S102), the display control unit 22 determines whether derived icons can be accommodated within one display box (there are five or more kinds of insertable programming items in this example) (Step S103). When the derived icons can be accommodated within one display box (YES at Step S103), the display control unit 22 causes the display unit 11 to display the display box in which the representative icon is set to the center, and the derived icons are arranged around the representative icon (Step S104). On the other hand, when the derived icons cannot be accommodated within one display box (there are six or more kinds of insertable programming items) (NO at Step S103), the display control unit 22 separates the derived icons into a plurality of groups, and causes the display unit 11 to display a display box in which the representative icon is set at the center and a part of the derived icons and a page-switching-operation icon are arranged around the representative icon, as a display box on a first page (Step S105).

Figure 5A:
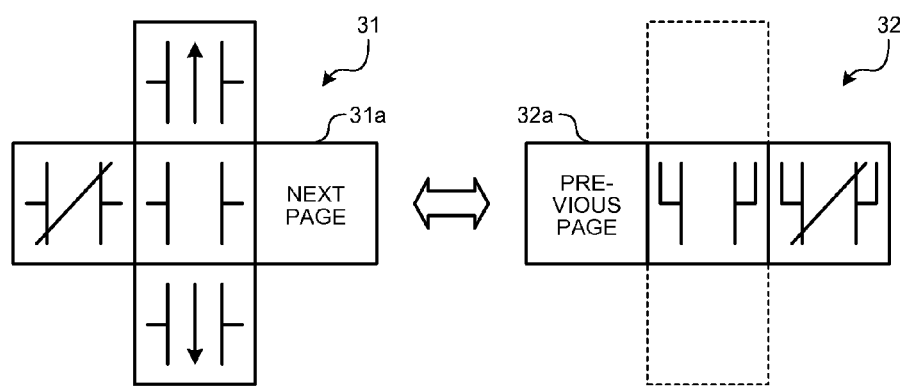
FIG. 5A is a sketch showing an example in which programming items that are insertable into a ladder diagram are arranged in separate display boxes on a plurality of pages.

FIG. 5A is a sketch showing an example in which derived icons are arranged in separate display boxes on a plurality of pages. A display box 31 on a first page includes a switching icon 31a for switching to a next page. A display box 32 on a second page includes a switching icon 32a for switching to a previous page.

Figure 5B:
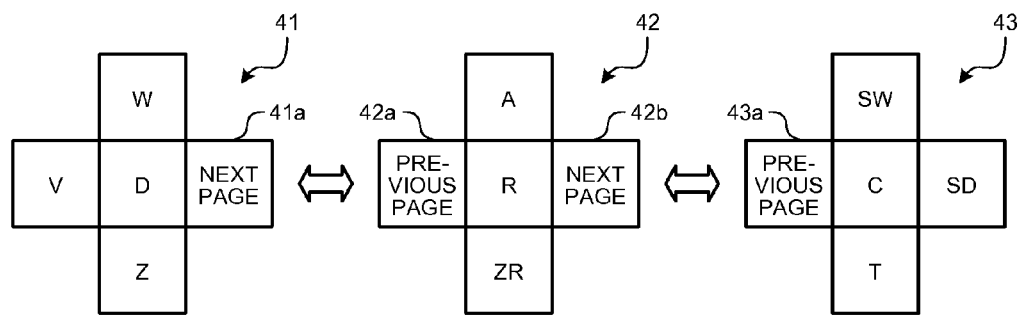
FIG. 5B is a sketch showing another example in which programming items that are insertable into a ladder diagram are arranged in separate display boxes on a plurality of pages.

FIG. 5B is a sketch showing another example in which derived icons are arranged in separate display boxes on a plurality of pages. A display box 41 on a first page includes a switching icon 41a for switching to a next page. A display box 42 on a second page includes a switching icon 42b for switching to a next page in addition to a switching icon 42a for switching to a previous page. A display box 43 on a third page includes a switching icon 43a for switching to a previous page.

A representative icon arranged at the center of each of the display boxes 31 and 41 on a first page is typical of the programming items of this kind. However, a program creator may select a representative icon. Furthermore, the display control unit 22 may automatically select a programming item that has been used lastly or a programming item that is used most frequently as a representative icon. This also applies to a case where there is only one display box (in a case where derived icons can be accommodated within one display box).

Thereafter, the operation detection unit 21 confirms whether a program creator releases his/her finger from the touch panel 12 (Step S106). When the program creator has lifted his/her finger off the touch panel 12 (YES at Step S106), the processing execution unit 23 inserts a programming item corresponding to the representative item into a ladder diagram (Step S113). This processing can be executed when the program creator taps an area where the representative icon is set.

When the program creator has not lifted his/her finger off the touch panel 12 (NO at Step S106), the operation detection unit 21 monitors whether the program creator performs an operation of sliding his/her finger on the touch panel 12 (Step S107). When the program creator performs the operation of sliding his/her finger on the touch panel 12 (YES at Step S107), the operation detection unit 21 confirms whether the sliding destination of the finger is on a switching icon for switching to a next page (Step S108). When the sliding destination of the finger is on the switching icon for switching to a next page (YES at Step S108), the display control unit 22 causes the display unit 11 to display a display box on a next page (Step S109). On the other hand, when the sliding destination of the finger is not on the switching icon for switching to a next page (NO at Step S108), the display control unit 22 confirms whether the sliding destination of the finger is on a switching icon for switching to a previous page (Step S110). When the sliding destination of the finger is on the switching icon for switching to a previous page (YES at Step S110), the display control unit 22 causes the display unit 11 to display a display box on a previous page (Step S111). In a case where there is only one display box, there is not a page switching icon. Therefore, it is clear that both the determinations at Steps S108 and S110 are NO.

Figure 6A:
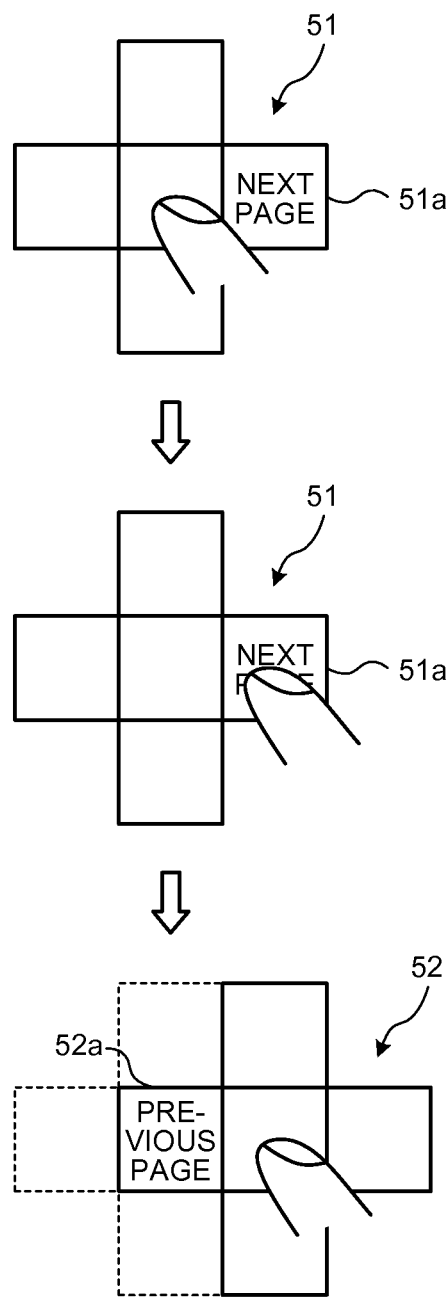
FIG. 6A is an illustration showing an example of an operation of switching between two display boxes.
Figure 6B:
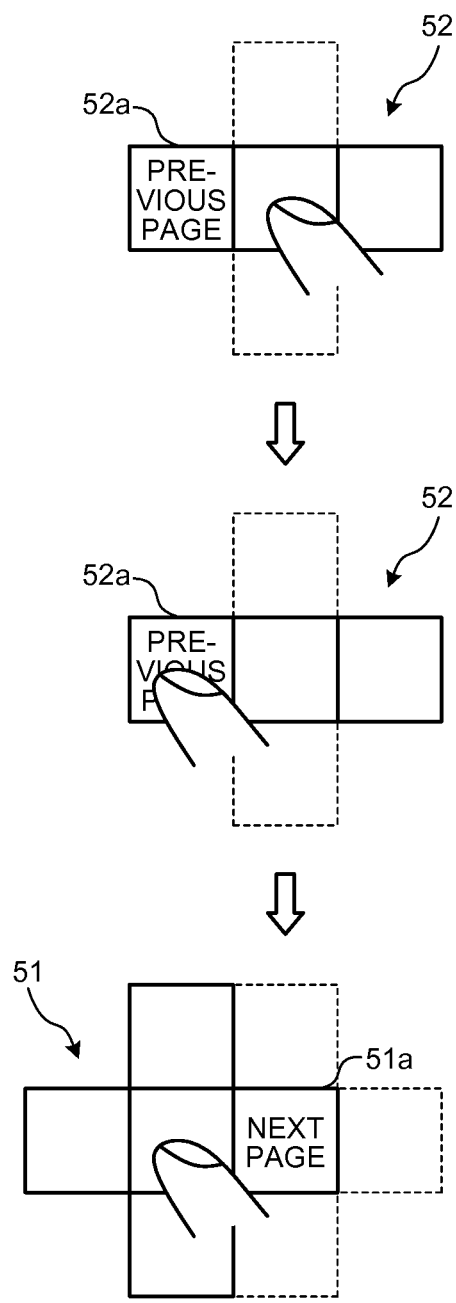
FIG. 6B is an illustration showing an example of an operation of switching between two display boxes.

FIGS. 6A and 6B are illustrations showing examples of an operation of switching between two display boxes in a case where there are six candidate programming items. The display control unit 22 allocates a box on the right side of a display box 51 on a first page to a switching icon 51a for switching to a next page. Meanwhile, the display control unit 22 allocates a box on the left side of a display box 52 on a second page to a switching icon 52a for switching to a previous page. As shown in FIG. 6A, when the sliding destination of the finger slid on the touch panel 12 is on the switching icon 51a for switching to a next page, the display control unit 22 displays the display box 52 on a second page in which the location where the switching icon 51a for switching to a next page has been displayed is set at the center in turn. By setting the location where the switching icon 51a for switching to a next page has been displayed, to the center, it is not necessary to move the finger to the display box 52 on a second page, and an input operation can be speeded up. As shown in FIG. 6B, when the sliding destination of the finger slid on the touch panel 12 is on the switching icon 52a for switching to a previous page, the display control unit 22 displays the display box 51 on a first page in which the location where the switching icon 52a for switching to a previous page has been displayed is set to the center. By setting the location where the switching icon 52a for switching to a previous page has been displayed, to the center, it is not necessary to move the finger to the display box 51 on a first page, and an input operation can be speeded up.

Figure 7A:
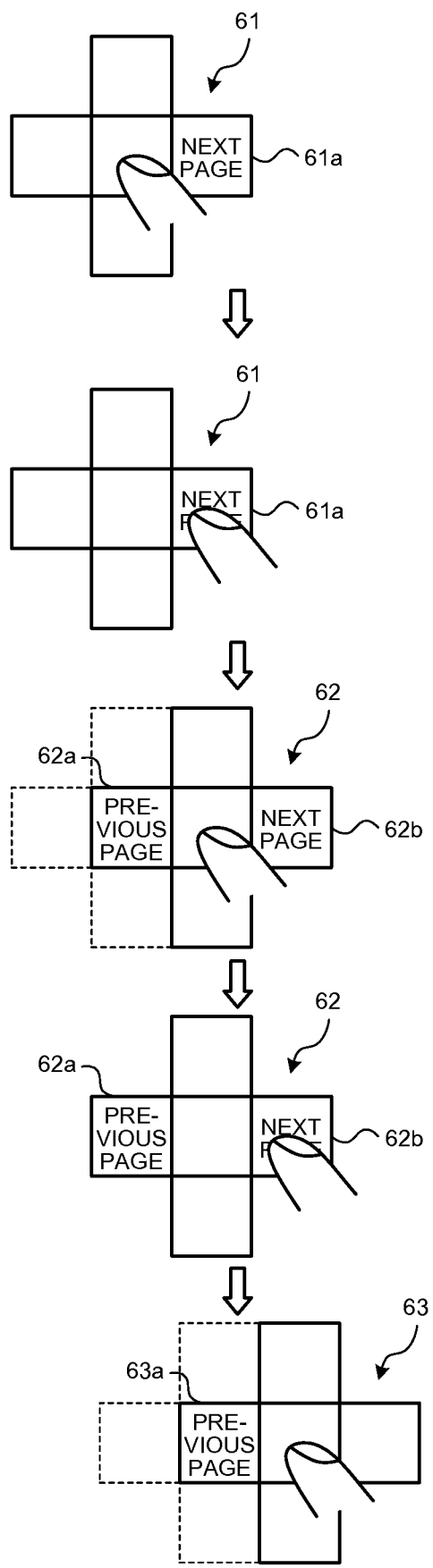
FIG. 7A is an illustration showing an example of an operation of switching among three display boxes.
Figure 7B:
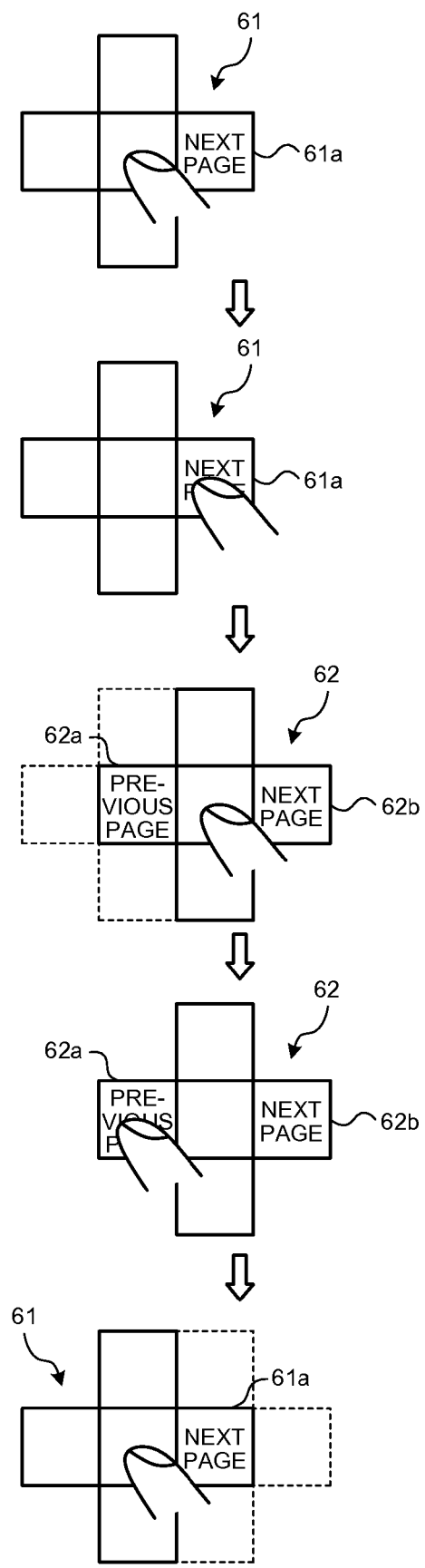
FIG. 7B is an illustration showing an example of an operation of switching among three display boxes.

FIGS. 7A and 7B are illustrations showing examples of an operation of switching among three display boxes in a case where there are eleven candidate programming items. The display control unit 22 displays programming item icons on three separate pages. The display control unit 22 allocates a box on the right side of a display box 61 on a first page to a switching icon 61a for switching to a next page. When the sliding destination of the finger slid on the touch panel 12 is on the switching icon 61a for switching to a next page, the display control unit 22 displays a display box 62 on a second page in which the location where the switching icon 61a for switching to a next page has been displayed is set to the center. A box on the left side of the display box 62 on a second page is allocated to a switching icon 62a for switching to a previous page, and a box on the right side thereof is allocated to a switching icon 62b for switching to a next page. By sliding a finger on the touch panel 12 in the leftward or rightward direction after having performed a touch operation, it is possible to continuously switch between pages. That is, when the sliding destination of the finger slid on the touch panel 12 is on the switching icon 62b for switching to a next page, the display control unit 22 displays a display box 63 on a third page in which the location where the switching icon 62b for switching to a next page has been displayed is set to the center. The display control unit 22 allocates a box on the left side of the display box 63 on a third page to a switching icon 63a for switching to a previous page. Meanwhile, when the sliding destination of the finger slid on the touch panel 12 is on the switching icon 62a for switching to a previous page, the display control unit 22 displays the display box 61 on a first page in which the location where the switching icon 62a for switching to a previous page has been displayed is set to the center. Similarly to the case where there are two display boxes, the speed of an input operation can be increased by displaying a display box on another page in which the position where a page-switching-operation icon has been displayed is set to the center.

It is also possible to display more programming item icons in separate display boxes on four or more pages by increasing the number of pages of display boxes such as the display box 62 on a second page that includes the switching icon 62a for switching to a previous page and the switching icon 62b for switching to a next page, as shown in FIG. 7B.

In the above page switching method, as a finger moves, the display position of a display box also moves. Therefore, the arrangement position of a page switching icon may be changed near an edge of the display unit 11. For example, near the right edge of the display unit 11, the display control unit 22 may place a switching icon for switching to a next page on a box on the upper or lower side of a display box, thereby making it possible to prevent a display box on a next page from being spread out of the display unit 11.

After the determination for a page switching operation is made, the operation detection unit 21 confirms whether or not an operation of lifting a finger off the touch panel 12 is performed (Step S112). When the operation of lifting a finger off the touch panel 12 is performed (YES at Step S112), the processing execution unit 23 determines that a programming item corresponding to a representative item or derived icon placed at the position where the finger is lifted off the touch panel is selected, and performs processing for inserting the selected programming item into an editor screen (Step S113). In a display box on a first page, this processing can be executed when a program creator performs a flick operation.

After the programming item is inserted, the display control unit 22 moves a cursor on the editor screen to the next input position. For example, when the inserted programming item is of a device, the display control unit 22 moves the cursor to a device-type entry field. As a specific example, when a contact is inserted into a ladder diagram, the display control unit 22 moves a cursor to above the inserted contact in order to input a device type such as X, Y, M, or T as a programming item, and then the device type is inserted through the above processing. After the device type is inserted, the display control unit 22 moves the cursor to the right side of the inserted device type in order to insert (input) an address, and then further performs the same processing. After the address is inserted, the display control unit 22 moves the cursor to the next cell. When an operation of lifting a finger off the touch panel 12 is not performed (NO at Step S112), the operation detection unit 21 monitors whether an operation of sliding the finger is performed (Step S107).

In the above example, an icon for switching between pages is displayed in a part of a cross-shaped display box. However, it is also possible to switch between pages upon detecting movement of a finger to the outside of the display box. By switching between pages in this manner, the number of programming item icons to be displayed per page can be increased. In a case where this page switching method is employed, page turning forward and page turning backward are associated with respective finger moving directions, and thereby page turning forward can be distinguished from page turning backward. For example, an upper right or upper left area outside of a display box is associated with the page turning forward, and a lower right or lower left area outside of the display box is associated with the page turning backward. By doing so, it is possible to distinguish a page forward-turning operation from a page backward-turning operation. Furthermore, switching between pages can be performed only for page turning forward, and when the page forward-turning operation is performed on the final page, the final page may be switched back to the first page.

As described above, according to the present embodiment, a representative icon corresponding to a representative programming item that is used frequently is set to the center, and derived icons corresponding to other programming items are arranged around the representative item. Therefore, for programming items whose icons can be all accommodated within a display box on a first page, a tap operation is performed on a representative icon set in the center, and a flick operation is performed on derived icons arranged around the center, so as to make it possible that a corresponding programming item is inserted into a ladder diagram, and consequently an input operation can be performed at a high speed. Therefore, a possibility of selecting a programming item that is different from an intended programming item due to an erroneous operation can be reduced. Furthermore, because a display box has a radial shape, the amount of moving a finger to each of the derived icons can be the same. Therefore, it is possible to obtain the same operational feel regardless of the positions of the derived icons. Particularly, because a display box has a cross shape, the directions of moving a finger to select a programming item are different from each other by 90 degrees, thereby resulting in remarkable effect of reducing the possibility of an erroneous operation.

Second Embodiment

Figure 8:
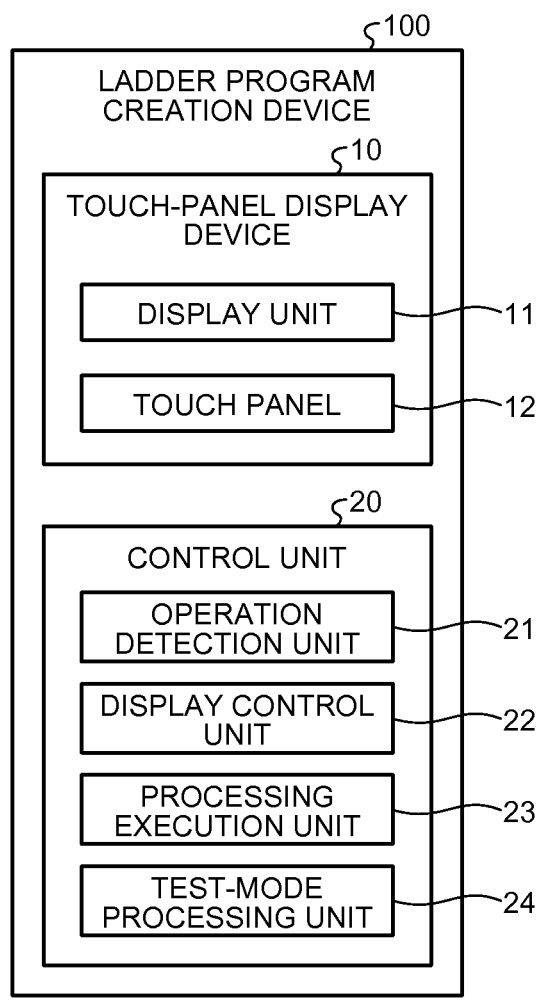
FIG. 8 is a diagram showing a configuration of a ladder program creation device according to a second embodiment of the present invention.

FIG. 8 is a diagram showing a configuration of a ladder program creation device according to a second embodiment of the present invention. The ladder program creation device 100 according to the second embodiment is different from that of the first embodiment in that the control unit 20 further has a test-mode processing unit 24.

A PLC that is a control device in the field of factory automation (FA) can deal with bit information and word information. Furthermore, the PLC is capable of allocating the bit information and the word information to respective registers to assign the information to the registers. Reading a value of the information is referred to as "monitor". The PLC is also capable of writing information into the register. This operation is referred to as "test", while monitor is equal to reading the information from the register.

As an operation for the test, it has been common to perform an ON/OFF operation on a bit register by pressing an ON icon or an OFF icon through an operation of a pointing device, and to directly input a value to a word register with a keyboard.

In the present embodiment, at the time of a test-mode operation, when the operation detection unit 21 detects that a touch operation is performed on a bit device or a word device that has already been arranged in a ladder diagram, the display control unit 22 displays an operation icon for a test operation with the device that has been touched being set to the center.

Figure 9A:
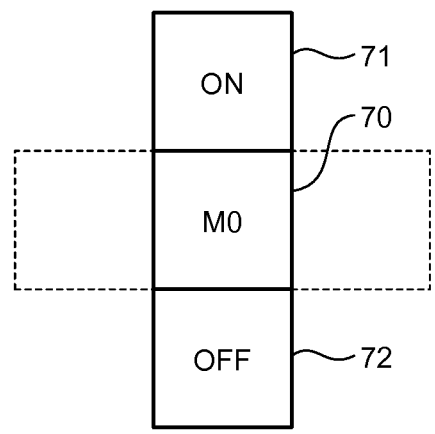
FIG. 9A is a sketch showing a display example of an operation icon when a touch operation is performed on a bit device at the time of a test-mode operation.
Figure 9B:
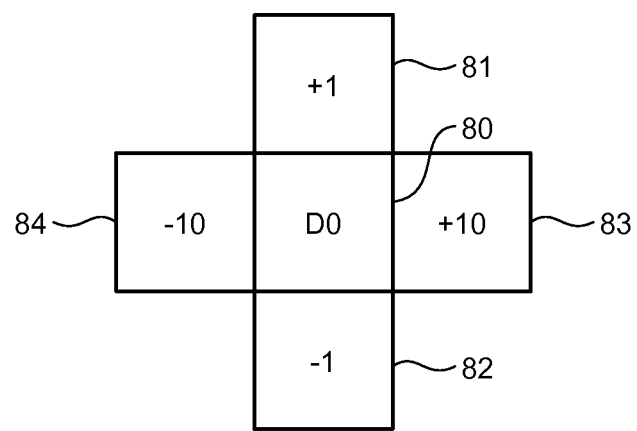
FIG. 9B is a sketch showing a display example of an operation icon when a touch operation is performed on a word device at the time of a test-mode operation.

FIG. 9A is a sketch showing a display example of an operation icon when a touch operation is performed on a bit device at the time of a test-mode operation. An icon corresponding to an "ON" operation is displayed in a box 71 on the upper side of a bit device 70. An icon corresponding to an "OFF" operation is displayed in a box 72 on the lower side of the bit device 70. FIG. 9B is a sketch showing a display example of an operation icon when a touch operation is performed on a word device at the time of a test-mode operation. An icon corresponding to a "+1" operation is displayed in a box 81 on the upper side of a word device 80. An icon corresponding to a "−1" operation is displayed in a box 82 on the lower side of the word device 80. An icon corresponding to a "+10" operation is displayed in a box 83 on the right side of the word device 80. An icon corresponding to a "−10" operation is displayed in a box 84 on the left side of the word device 80.

When the operation detection unit 21 detects that a program creator slides his/her finger on the touch panel 12 and lifts the finger on the operation icon off there, the test-mode processing unit 24 executes processing corresponding to the operation icon placed at the position where the finger has just been lift off.

Therefore, in a test mode, the ladder program creation device 100 according to the present embodiment can perform an ON operation of a bit device by tracing a screen with the finger in the upward direction from the bit device, and can perform an OFF operation of the bit device by tracing the screen with the finger in the downward direction from the bit device. Furthermore, the ladder program creation device 100 can change a value of the word device to be written into a word register by +1 (increment) by tracing the screen with the finger in the upward direction from the word device, by −1 (decrement) by tracing the screen with the finger in the downward direction from the word device, by +10 by tracing the screen with the finger in the rightward direction from the word device, and by −10 by tracing the screen with the finger in the leftward direction from the word device. Further, continuous action of the tracings can also be realized.

According to the present embodiment, it is possible to perform an intuitive operation during a test mode, and therefore improved operability is achieved.

In the above embodiments, the configuration using a touch panel has been explained as an example. However, it is also possible to use a pointing device such as a tablet (graphics tablet) to perform the same operations as described above. In a case where a pointing device such as a mouse is used, a touch operation on a touch panel may be replaced with "hold (continuously press for a long time)", and an operation of sliding a finger while the finger remains touched on the touch panel may be replaced with "drag".

In the embodiments described above, a case where display boxes are cross-shaped has been explained as an example; however, the display boxes may also be matrix shaped, honeycomb shaped, or fan shaped.

INDUSTRIAL APPLICABILITY

As described above, the ladder program creation device according to the present invention is useful since an intuitive input operation is possible for input operations at the time of creating a ladder program, and erroneous inputs can be reduced.

REFERENCE SIGNS LIST 10 touch-panel display device
11 display unit
12 touch panel
20 control unit
21 operation detection unit
22 display control unit
23 processing execution unit
24 test-mode processing unit
31, 41, 51, 61 display box on first page
31a, 41a, 42b, 51a, 61a, 62b switching icon for switching to next page
32, 42, 52, 62 display box on second page
32a, 42a, 43a, 52a, 62a, 63a switching icon for switching to previous page
43, 63 display box on third page
70 bit device
71, 81 box on upper side
72, 82 box on lower side
80 word device
83 box on right side
84 box on left side

The invention claimed is:

1. A ladder program creation device comprising:
a display unit that displays an editor screen used to create a ladder diagram;
a touch panel that is provided to overlap on the display unit;
an operation detection unit that detects an operation performed on the touch panel;
a display control unit that causes the display unit to display a representative icon corresponding to one of programming items that are insertable into the ladder diagram within the editor screen, and that causes the display unit to display a display box in which one or more derived icons corresponding to other programming items that are insertable into the ladder diagram are arranged around the representative item, when the operation detection unit detects a touch operation on the touch panel at a position where the representative icon is displayed; and
a processing execution unit that, when the operation detection unit detects that a finger having performed the touch operation or a finger having performed the touch operation and then slid is lifted off the touch panel, inserts the programming item corresponding to the representative icon or the derived icon displayed at a position where the finger is detected to be lifted off the touch panel, into the ladder diagram.

2. The ladder program creation device according to claim 1, wherein when the operation detection unit detects a touch operation on the touch panel at a position where the representative icon is displayed, in a case where the number of programming items that are insertable into the ladder diagram is more than the number of programming items that can be arranged in the display box, the display control unit causes the display unit to display a display box in which a part of the derived icons and a page-switching-operation icon are arranged around the representative icon, and in a case where a finger having performed the touch operation and then slid is placed on the page-switching-operation icon, the display control unit causes the display unit to display another display box on a different page in which an other part of the derived icons and a page-switching-operation icon are arranged, in which a location where the page-switching-operation icon has been placed in the display box is set to a center of the display box on the different page.

3. The ladder program creation device according to claim 1, further comprising a test-mode processing unit, wherein
in a test mode for testing a programming item inserted already into the ladder diagram, when the operation detection unit detects a touch operation at a display position of the programming item having already been inserted in the ladder diagram, the display control unit causes the display unit to set the display position of the programming item having already been inserted in the ladder diagram to a center, and display a test-operation icon of the programming item around the center, and
in a case where the programming item that is a target of the test is a bit device, when the operation detection unit detects that a finger having performed the touch operation and then slid therefrom in an upward direction is lifted off the touch panel, the test-mode processing unit executes processing for switching the bit device ON, and when the operation detection unit detects that a finger having performed the touch operation and then slid in a downward direction is lifted off the touch panel, the test-mode processing unit executes processing for switching the bit device OFF, and
in a case where the programming item that is a target of the test is a word device, when the operation detection unit detects that a finger having performed the touch operation and then slid in an upward direction is lifted off the touch panel, the test-mode processing unit executes processing for incrementing a value of the word device by 1, when the operation detection unit detects that a finger having performed the touch operation and then slid in a downward direction is lifted off the touch panel, the test-mode processing unit executes processing for decrementing a value of the word device by 1, when the operation detection unit detects that a finger having performed the touch operation and then slid in a rightward direction is lifted off the touch panel, the test-mode processing unit executes processing for incrementing a value of the word device by 10, and when the operation detection unit detects that a finger having performed the touch operation and then slid in a leftward direction is lifted off the touch panel, the test-mode processing unit executes processing for decrementing a value of the word device by 10.

4. The ladder program creation device according to claim 1, wherein the representative icon is selectable by a program creator, is set as an icon corresponding to a programming item that has been used lastly, or is set as an icon corresponding to a programming item that is most-frequently used.

5. The ladder program creation device according to claim 1, further comprising a test-mode processing unit, wherein in a test mode for testing a programming item inserted already into the ladder diagram, when the operation detection unit detects a touch operation at a display position of the programming item having already been inserted in the ladder diagram, the display control unit causes the display unit to set the display position of the programming item having already been inserted in the ladder diagram to a center, and display a test-operation icon of the programming item around the center, and when the operation detection unit detects that a finger having performed the touch operation and then slid therefrom in an upward direction is lifted off the touch panel, the test-mode processing unit executes processing corresponding to the test-operation icon displayed at a position where the finger is detected to be lifted off the touch panel.

\* \* \* \* \*